US009063687B2

(12) United States Patent
Kanakubo

(10) Patent No.: US 9,063,687 B2
(45) Date of Patent: Jun. 23, 2015

(54) INFORMATION PROCESSING APPARATUS, METHOD FOR CONTROLLING INFORMATION PROCESSING APPARATUS, IMAGE FORMING APPARATUS, METHOD FOR CONTROLLING IMAGE FORMING APPARATUS, AND RECORDING MEDIUM

(71) Applicant: Canon Kabushiki Kaisha, Tokyo (JP)

(72) Inventor: Yukio Kanakubo, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 13/716,482

(22) Filed: Dec. 17, 2012

(65) Prior Publication Data
US 2013/0155458 A1 Jun. 20, 2013

(51) Int. Cl.
*G06F 3/12* (2006.01)
*G06F 1/32* (2006.01)

(52) U.S. Cl.
CPC ............ *G06F 3/1296* (2013.01); *G06F 3/1204* (2013.01); *G06F 3/1229* (2013.01); *G06F 3/1285* (2013.01); *Y02B 60/1267* (2013.01); *G06F 1/3284* (2013.01); *Y02B 60/32* (2013.01)

(58) Field of Classification Search
USPC .......... 101/484; 713/100, 300, 320, 324, 340; 358/1.6
See application file for complete search history.

(56) References Cited

U.S. PATENT DOCUMENTS

| 6,389,544 | B1 * | 5/2002 | Katagiri ........................ 713/300 |
| 7,290,044 | B2 * | 10/2007 | Yuki ............................ 709/223 |
| 7,852,501 | B2 * | 12/2010 | Terada et al. ................ 358/1.14 |
| 7,855,798 | B2 * | 12/2010 | Toyoda ........................ 358/1.15 |
| 2002/0134268 | A1 * | 9/2002 | Yamada ........................ 101/484 |
| 2004/0051895 | A1 * | 3/2004 | Aizawa ........................ 358/1.13 |
| 2012/0050798 | A1 * | 3/2012 | Abe .............................. 358/1.15 |
| 2013/0111072 | A1 * | 5/2013 | Takeuchi et al. ................ 710/10 |

FOREIGN PATENT DOCUMENTS

| JP | 2002-059616 A | 2/2002 |
| JP | 2002-077689 A | 3/2002 |
| JP | 2002-287936 A | 10/2002 |
| JP | 2009-093419 A | 4/2009 |

* cited by examiner

*Primary Examiner* — Jerome Grant, II
(74) *Attorney, Agent, or Firm* — Canon USA, Inc. IP Division

(57) ABSTRACT

An information processing apparatus is configured to be capable of communication with an image forming apparatus through a network and to operate in a first power state where information can be transmitted to outside and a second power state where information cannot be output to outside. The information processing apparatus includes an acquisition unit configured to acquire information indicating a state of the image forming apparatus, a storage unit configured, if the information acquired by the acquisition unit includes information indicating that the image forming apparatus enters the second power state, to store the information, and a control unit configured, if the communication with the image forming apparatus is disabled in a state that the information is stored in the storage unit, to display information indicating that the image forming apparatus enters the second power state on a display section.

7 Claims, 13 Drawing Sheets

INFORMATION PROCESSING APPARATUS, METHOD FOR CONTROLLING INFORMATION PROCESSING APPARATUS, IMAGE FORMING APPARATUS, METHOD FOR CONTROLLING IMAGE FORMING APPARATUS, AND RECORDING MEDIUM

BACKGROUND OF THE INVENTION

1. Field of the Invention

The present invention relates to an information processing apparatus which acquires a state of an image forming apparatus, a method for controlling an information processing apparatus, an image forming apparatus, a method for controlling an image forming apparatus, and a recording medium.

2. Description of the Related Art

A system that can display a status of a network-connected device on a display section of an information processing apparatus is known. A status display application such as a printer driver is used to display the status of the device on the display section of the information processing apparatus. To acquire the status of the device, the information processing apparatus in the system regularly transmits a status acquisition command to the network-connected device. The device in the system sends back status information indicating the status of the device in response to the status acquisition command transmitted from the information processing apparatus. As a result, the information processing apparatus can display the status of the device on the display section (see Japanese Patent Application Laid-Open Nos. 2002-077689 and 2002-059616).

When the device is powered off, the device becomes unable to send back the status information of the device to the information processing apparatus. When the information processing apparatus transmits a status acquisition command and gets no reply to the command, the information processing apparatus determines that the communication with the device is disabled, and displays a message "communication error" on the display section. The message "communication error," however, can be displayed not only when the device is powered off but also for the following reasons:

The turning off of a power switch by a user's operation;
An unplugged network cable or failed network cable;
A communication failure (the network going down) due to a trouble in the network environment; and
IP address misconfiguration.

Since the foregoing message "communication error" can be displayed because of such various reasons, the user cannot identify the reason why the communication with the device is disabled. Take, for example, a handy device such as a camera. When a camera is powered off, the user can recognize it and can determine that the communication between the device and the information processing apparatus is disabled because the device is powered off. On the other hand, in an environment where the information processing apparatus and the device are located in remote locations over a network, the user cannot recognize that the device is powered off. The user is thus unable to identify the reason why the communication with the device is disabled.

SUMMARY OF THE INVENTION

The present invention is directed to displaying, when an external apparatus enters a low power state, that the external apparatus enters the low power state, on a display section of an information processing apparatus.

According to an aspect of the present invention, an information processing apparatus capable of communication with an external apparatus through a network, includes a reception unit configured to receive from the external apparatus information indicating that the external apparatus enters a low power state, a storage unit configured to store the information received by the reception unit, a determination unit configured to determine whether the communication with the external apparatus is disabled, and a display unit configured, if the information is stored in the storage unit when the determination unit determines that the communication with the external apparatus is disabled, to display information indicating that the external apparatus has entered the low power state on a display section, and if the information is not stored in the storage unit, to display information indicating that the communication with the external apparatus is disabled, on the display section.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

(Overall Configuration of Printing System)

Figure 1:
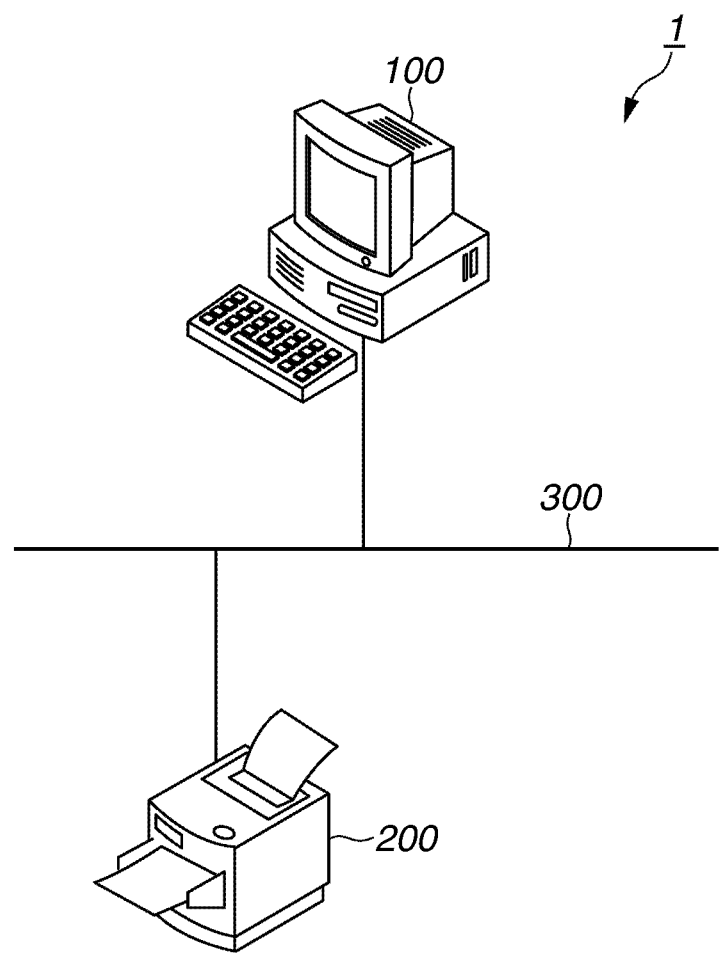
FIG. 1 is a diagram illustrating an overall configuration of a printing system according to a first exemplary embodiment of the present invention.

As illustrated in FIG. 1, a printing system (image forming system) 1 according to a first exemplary embodiment of the present invention includes a host computer (information processing apparatus) 100 and a printing apparatus (image forming apparatus) 200 which can be connected to the host computer 100 through a network 300. In the printing system 1, the host computer 100 and the printing apparatus 200 communicate through a bidirectional interface 150 (see FIG. 2). The bidirectional interface 150 may be a wired one such as a local area network (LAN) and a Universal Serial Bus (USB), or a wireless one such as a wireless LAN.

(Hardware Configuration of Host Computer)

Figure 2:
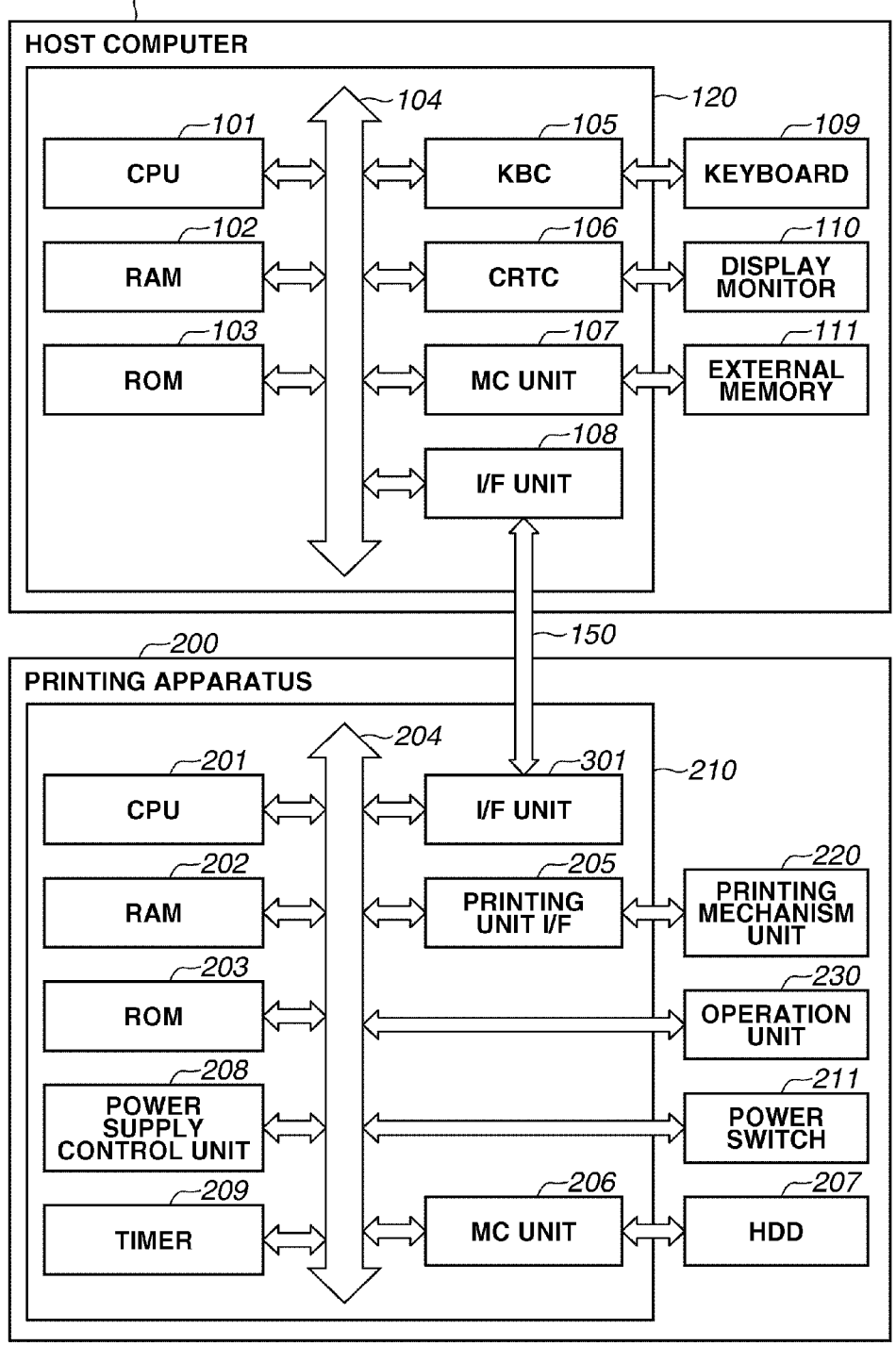
FIG. 2 is a hardware block diagram of the printing system illustrated in FIG. 1.

As illustrated in FIG. 2, the host computer 100 includes a controller 120, a keyboard 109, a display monitor (display section) 110, and an external memory 111.

The controller 120 includes a central processing unit (CPU) 101, a random access memory (RAM) 102, a read only memory (ROM) 103, a keyboard controller (hereinafter, referred to as KBC) 105, a cathode-ray tube (CRT) controller (hereinafter, referred to as CRTC) 106, a memory controller (hereinafter, referred to as MC) 107, and an interface unit (I/F unit) 108. Such devices are connected to a system bus 104.

The CPU 101 controls the devices connected to the system bus 104. The CPU 101 performs various types of data processing based on programs stored in the ROM 103. For example, the CPU 101 processes a document which includes figures, images, characters, and tables (including spreadsheets) based on a document processing program stored in the ROM 103. The CPU 101 rasterizes outline fonts in a display information RAM allocated to the RAM 102, thereby implementing what-you-see-is-what-you-get (WYSIWYG) display on a CRT display. The CPU 101 opens various windows and performs various types of data processing based on commands designated by a mouse cursor on the display monitor 110.

The RAM 102 functions as a main memory and a work area of the CPU 101.

The ROM 103 includes a font ROM, a program ROM, and a data ROM. The font ROM stores font data for use in document processing. The program ROM stores a control program for controlling the host computer 100 and other programs such as a printer selector and a network printer driver. The data ROM stores various types of data for use in document processing.

The KBC 105 controls input from the keyboard 109 and a pointing device (not illustrated).

The CRTC 106 controls display of the display monitor 110.

The MC 107 controls input and output from/to the external memory 111 which stores a boot program, various types of applications, font data, user files, and edit files. Examples of the external memory 111 include a hard disk drive (HDD).

The I/F unit 108 controls communications performed by the printing apparatus 200 through the bidirectional interface 150.

(Hardware Configuration of Printing Apparatus)

As illustrated in FIG. 2, the printing apparatus 200 includes a printer controller 210, a printing mechanism unit 220, an operation unit 230, an HDD 207, and a power switch 211. The printing apparatus 200 operates in power states including a standby state (first power state) and a power-off state (second power state). In the standby state, the printer controller 210, the printing mechanism unit 220, the operation unit 230, and the HDD 207 are supplied with power. In the power-off state, the foregoing supply of the power to the printer controller 210, the printing mechanism unit 220, the operation unit 230, and the HDD 207 is stopped. A shift to the power-off state occurs when the user turns off the power switch 211 or when an automatic power-off function to be described later is executed.

The printer controller 210 includes a CPU 201, a RAM 202, a ROM 203, an I/F unit 301, a printing unit interface (hereinafter, referred to as a printing unit I/F unit) 205, an MC unit 206, a power supply control unit 208, and a timer 209. Such devices are connected to a system bus 204.

The CPU 201 controls the devices connected to the system bus 204. The CPU 201 executes a control program stored in the ROM 23 to perform data processing. For example, the CPU 201 generates image data and outputs an image signal related to the image data to the printing mechanism unit 200 through the printing unit I/F unit 205. The CPU 201 transmits a control signal to the printing mechanism unit 200 through the printing unit I/F unit 205. The CPU 201 further transmits information about the printing apparatus 200 to the host computer 100 through the I/F unit 301.

The RAM 202 functions as a main memory and a work area of the CPU 201. Optional RAMs can be added to not-illustrated expansion ports to expand the memory capacity of the RAM 202. The RAM 202 also functions as an image data storage area for storing rasterized image data, an environment data storage area for storing environment data, and a nonvolatile RAM (NVRAM) for storing various parameters.

The ROM 203 includes a font ROM, a program ROM, and a data ROM. The font ROM stores font data that is used for generating image data. The program ROM stores a control program to be executed by the CPU 201. The data ROM stores various types of data for use in data processing.

The I/F unit 301 controls communications performed by the host computer 100 through the bidirectional interface 150.

The printing unit I/F unit 205 controls communications with the printing mechanism unit 220.

The operation unit 230 is an operation panel for making key inputs and displaying information. The operation unit 230 includes switches and light-emitting diode (LED) indicators. The operation unit 230 may be a touch panel.

The MC unit 206 controls access to the HDD 207. The HDD 207 stores print data and a control program.

The power supply control unit 208 controls the supply and stop of power to the components of the printing apparatus 200 in response to a signal from the CPU 101. In the standby state, the power supply control unit 208 supplies power to the printer controller 210, the printing mechanism unit 220, the operation unit 230, and the HDD 207. In the power-off state, the power supply control unit 208 stops the supply of the power to the printer controller 210, the printing mechanism unit 220, the operation unit 230, and the HDD 207. In the power-off state, the printing apparatus 200 becomes unable to notify information to the host computer 100 since the supply of the power to the I/F unit 301 of the printer controller 210 is stopped.

The timer 209 starts to measure time when a condition for the execution of the automatic power-off function to be described later is satisfied and when the power switch 211 is turned off.

The power switch 211 is a switch for the user to operate when supplying power to the components of the printing apparatus 200 and stopping the supply of the power to the components of the printing apparatus 200. The power switch 211 is connected to the CPU 201 through the system bus 204. Each time the user depresses the power switch 211, the power switch 211 transmits a signal to the CPU 201.

(Detailed Configuration of Printing Mechanism)

Next, the printing mechanism unit 220 of the printing apparatus 200 will be described in detail with reference to FIG. 3.

The present exemplary embodiment deals with a case where the printing apparatus 200 described above is a laser beam printer of a rotating development rotary type.

A scanner 711 includes a laser output unit (not illustrated), a polyhedral polygonal mirror 712, a motor (not illustrated) which rotates the polygonal mirror 712, and an f/θ lens (imaging lens) 713. The laser output unit converts an image signal from the printer controller 210 into a light signal (laser light). The laser light emitted from the laser output unit is reflected by one of the side surfaces of the polygonal mirror 712, and passes the f/θ lens 713 and a reflection mirror 714. The surface of a photosensitive drum 715 is linearly scanned (raster scans) with the laser light.

The photosensitive drum 715 rotates in the direction of the illustrated arrow. An electrostatic latent image corresponding to an image expressed by the image signal is thus formed on the surface of the photosensitive drum 715. A primary charging unit 717, a whole surface exposure lamp 718, a cleaner unit 723, and a pre-transfer charging unit 724 are arranged around the photosensitive drum 715. The cleaner unit 723 collects toner which has not been transferred to a sheet (residual toner).

A developing device unit 726 is a unit for developing the electrostatic latent image formed on the surface of the photosensitive drum 715. The developing device unit 726 has the following configuration. Toner cartridges 730C, 730M, 730Y, and 730BK store toners, or developers. Developing sleeves 731C, 731M, 731Y, and 731BK each make contact with the photosensitive drum 715 to perform development by using the developers. Screws 732 convey the developers stored in the toner cartridges 730C, 730M, 730Y, and 730BK to the developing sleeves 731C, 731M, 731Y, and 731BK, respectively. More specifically, cyan, magenta, yellow, and black developers are used to form toner images on the photosensitive drum 715.

The toner cartridges 730C, 730M, 730Y, and 730BK, the developing sleeves 731C, 731M, 731Y, and 731BK, and the screws 732 are arranged around a center axis P of the developing device unit 726. The symbols Y, M, C, and BK of the components represent different colors. Specifically, C represents cyan, M magenta, Y yellow, and BK black.

A position sensor 742 detects a rotational position of the developing device unit 726. To form a yellow toner image on the photosensitive drum 715, a not-illustrated motor rotates the developing device unit 726 about the center axis P so that the developing sleeve 731Y comes into contact with the photosensitive drum 715. FIG. 2 illustrates such a state. To form a magenta toner image, the motor rotates the developing device unit 726 about the center axis P so that the developing sleeve 731M comes into contact with the photosensitive drum 715. Cyan and black toner images are formed in a similar manner.

A transfer drum 716 transfers the toner images formed on the photosensitive drum 715 to a sheet. An actuator plate 719 detects a moving position of the transfer drum 716. A position sensor 720 lies close to the actuator plate 719 to detect that the transfer drum 716 has reached a home position.

The actuator plate 719, the position sensor 720, a transfer drum cleaner unit 725, a paper pressing roller 727, and a discharging unit or transfer charging unit 729 are arranged around the transfer drum 716.

Sheet feeding cassettes 735 and 736 store sheets 791. For example, the sheet feeding cassette 735 stores A4-sized sheets. The sheet feeding cassette 736 stores A3-sized sheets. In sheet feeding and sheet conveyance, sheet feeding rollers 737 and 738 feed a sheet from the sheet feeding cassettes 735 and 736, respectively. Timing rollers 739, 740, and 741 control timing for performing sheet feeding and sheet conveyance. A sheet is passed between the timing rollers 739, 740, and 741, guided by a paper guide 490, and wound about the transfer drum 716 with its leading edge carried by a gripper 728. Whether the sheet feeding cassette 735 or 736 is to be selected is determined by an instruction from the printer controller 210. Only the feeling roller corresponding to the selected sheet feeding cassette is rotated.

With the foregoing configuration, full color printing using four colors C, M, Y, and BK is performed.

(Functional Blocks of Host Computer)

The host computer 100 functions as a server or a client. The host computer 100 includes input/output devices such as the keyboard 109, a mouse 112, and the display monitor 110.

Figure 4:
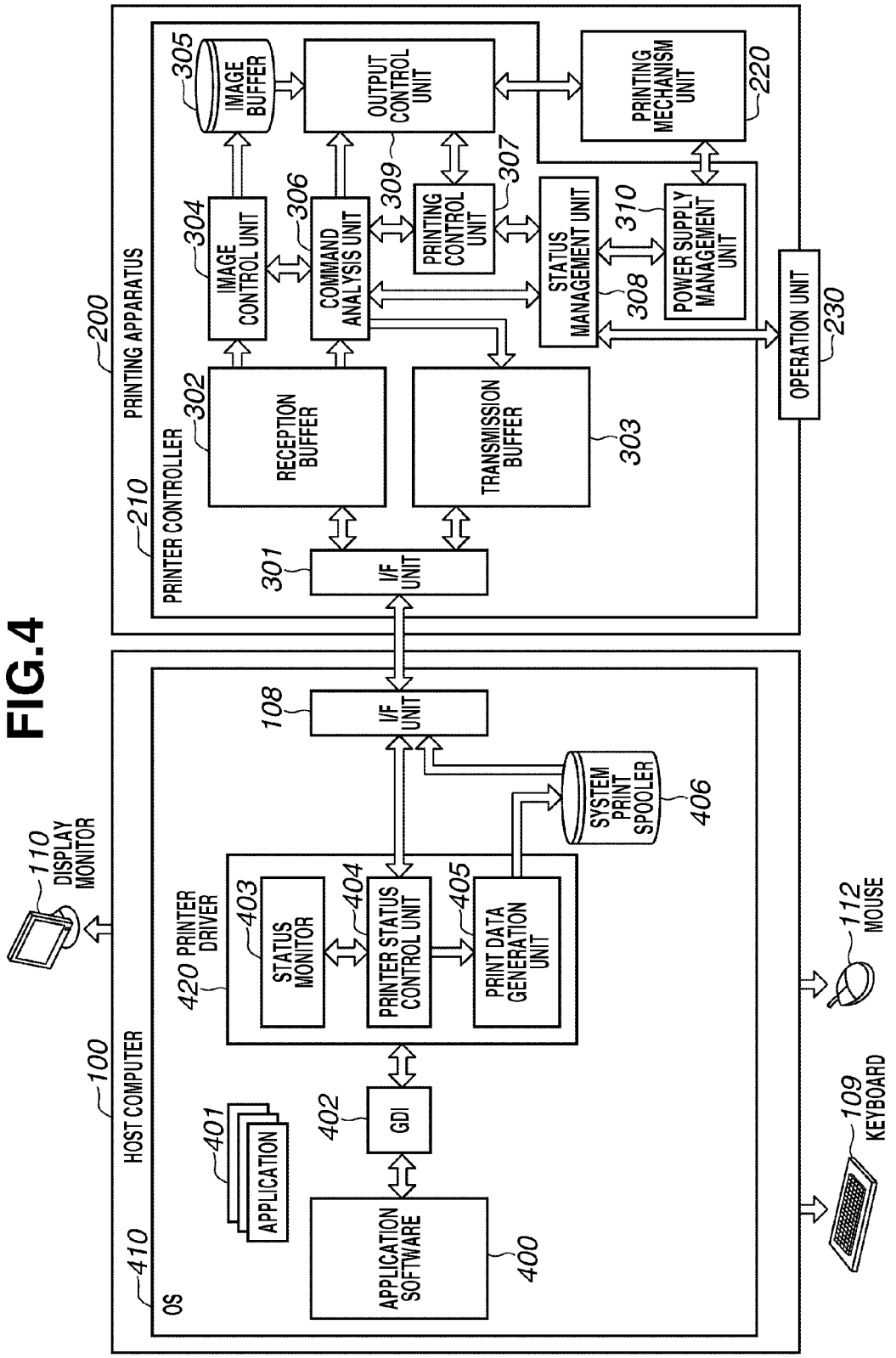
FIG. 4 is a functional block diagram of the printing system illustrated in FIG. 1.

As illustrated in FIG. 4, the host computer 100 operates based on a basic operating system (OS) 410. The host computer 100 operating on the basic OS 410 is provided with application software 400, a graphic device interface (GDI) 402, a printer driver 420, and a system print spooler 406. The GDI 402 is a part of the basic OS 410. The application software 400, the basic OS 410, and the printer driver 420 are stored in the external memory 111. The RAM 102 described above functions as the system print spooler 406. The system print spooler 406 temporarily stores data generated by the printer driver 420.

Figure 3:
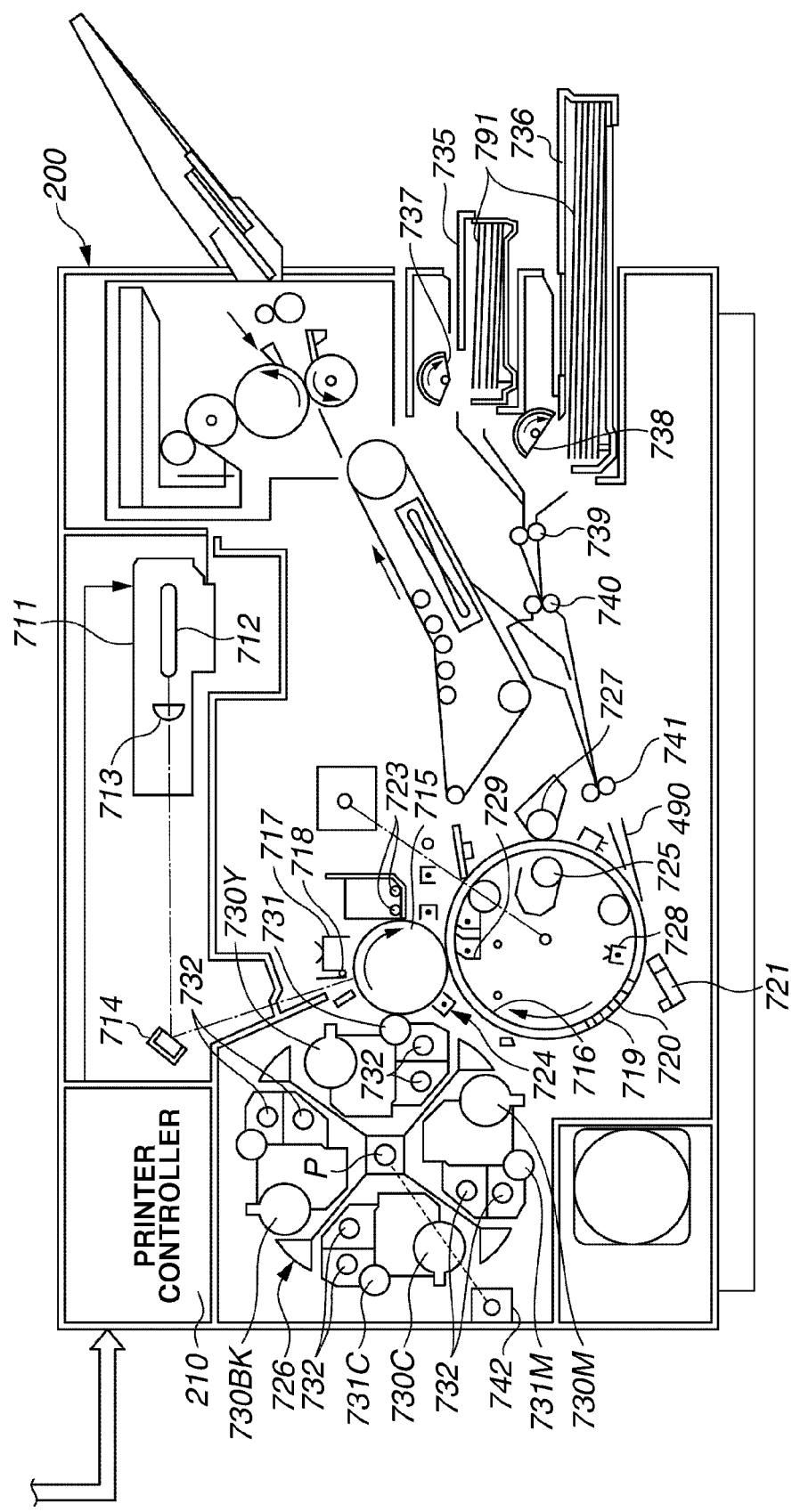
FIG. 3 is a diagram illustrating an internal structure of a printing mechanism of the printing apparatus illustrated in FIG. 1.

Software referred to as basic software (basic input-output system (BIOS)) controls the host computer 100 with the hardware illustrated in FIG. 3, including the CPU 101, the RAM 102, the ROM 103, and the external memory 111. Application software runs on the basic software.

The printer driver 420 is apiece of such application software. The application software 400 of FIG. 4 refers to application software that runs on the basic software such as a word processor program and a spreadsheet program. A plurality of pieces of application software may be activated at arbitrary timing (depending on the capacity of the main memory).

Next, a case where an image editing program is used as the application software 400 will be described.

The user performs an image editing operation by using the application software 400. To print an edited image, the user selects a print menu displayed on the display monitor 110 by using the mouse 112 and executes printing. Next, the application software 400 calls the GDI 402, a part of the functions of the basic OS 410. The GDI 402 includes a group of basic functions for controlling display devices and printing devices, including screen display and print output. Application software from various vendors uses the group of basic functions such that the application software can be run without being aware of model (hardware)-dependent portions.

The printer driver 420 manages information dependent on the models of respective printing apparatuses. The GDI 402 acquires information about the drawing capabilities and printing resolution of the printing device (in the present case, the printing apparatus 200) from the printer driver 420. The GDI 402 then processes an application program interface (API) function called by the application software 400, and calls a function the printer driver 420 provides for the GDI 402 according to the processing content. The function is constituted as a predetermined interface (device driver interface: DDI). A creator of a printer driver creates the printer driver mostly by dealing with data conversion from such an interface to an actual printing apparatus.

A print data generation processing unit 405 performs processing for generating print data (image bitmap data) based on DDI information received from the GDI 402 and print environment settings made by its own graphical user interface (GUI). The print data generation processing unit 405 then outputs the print data to a system print spooler 406. The print data output to the system print spooler 406 is output to the printing apparatus 200 through the I/F unit 108. A printer status control unit 404 issues a status acquisition command to the printing apparatus 200 and thereby monitors a status of the printing apparatus 200. A status monitor 403 displays the status of the printing apparatus 200.

(Functional Blocks of Printing Apparatus)

Next, functional blocks of the printing apparatus 200 will be described.

The printing apparatus 200 mainly includes the printer controller 210, the operation unit 230, and the printing mechanism unit 220.

The printer controller 210 includes an I/F unit 301, a reception buffer 302, a transmission buffer 303, an image buffer 305, a command analysis unit 306, a printing control unit 307, an image control unit 304, an output control unit 309, a status management unit 308, and a power supply management unit 310. The I/F unit 301 is a unit for connecting to the host computer 100. The reception buffer 302 temporarily stores and manages reception data. The transmission buffer 303 temporarily stores and manages transmission data. The command analysis unit 306 analyzes print data.

The RAM 202 of the printing apparatus 200 functions as the reception buffer 302, the transmission buffer 303, and the image buffer 305. The CPU 201 of the printing apparatus 200 functions as the command analysis unit 306, the printing control unit 307, the image control unit 304, and the status management unit 308. The power supply control unit 208 of the printing apparatus 200 functions as the power supply management unit 310. The printing unit I/F unit 205 of the printing apparatus 200 functions as the output control unit 309.

The I/F unit 301 is a communication unit that transmits and receives information (such as print data) to/from the host computer 100. Print data output from the host computer 100 is temporarily stored into the reception buffer 302 through the I/F unit 301. The print data stored in the reception data buffer 302 is read and processed by the command analysis unit 306 and/or the image control unit 304 when needed. The command analysis unit 306 includes control programs conforming to respective print control command systems and print job control languages. If a command analyzed by the command analysis unit 306 is related to image data such as bitmap data, the command analysis unit 306 outputs an instruction to the image control unit 304. If a command analyzed by the command analysis unit 306 is a non-drawing command such as a paper feeding selection command and a reset command, the command analysis unit 306 outputs an instruction to the printing control unit 307.

The image control unit 304 removes a command portion from transferred image data command data. If the resultant is compressed image data, the image control unit 304 performs decompression processing and stores the resulting data into the image buffer 305.

The status management unit 308 determines the status of the printing apparatus 200 based on information output from the printing control unit 307, and makes the operation unit 230 display the state of the printing apparatus 200. The status management unit 308 sends back status information indicating the status of the printing apparatus 200 in response to the status acquisition command transmitted from the host computer 100.

The power supply management unit 310 controls the supply of the power to the printing mechanism unit 220 according to an instruction from the status management unit 308.

The output control unit 309 performs processing for converting the image bitmap data stored in the image buffer 305 into a video image, and outputs the video signal to the printing mechanism unit 220. The printing mechanism unit 200 receives the video signal output from the output control unit 309 and forms an image on a recording sheet.

(Description of Operation of Host Computer)

Figure 5:
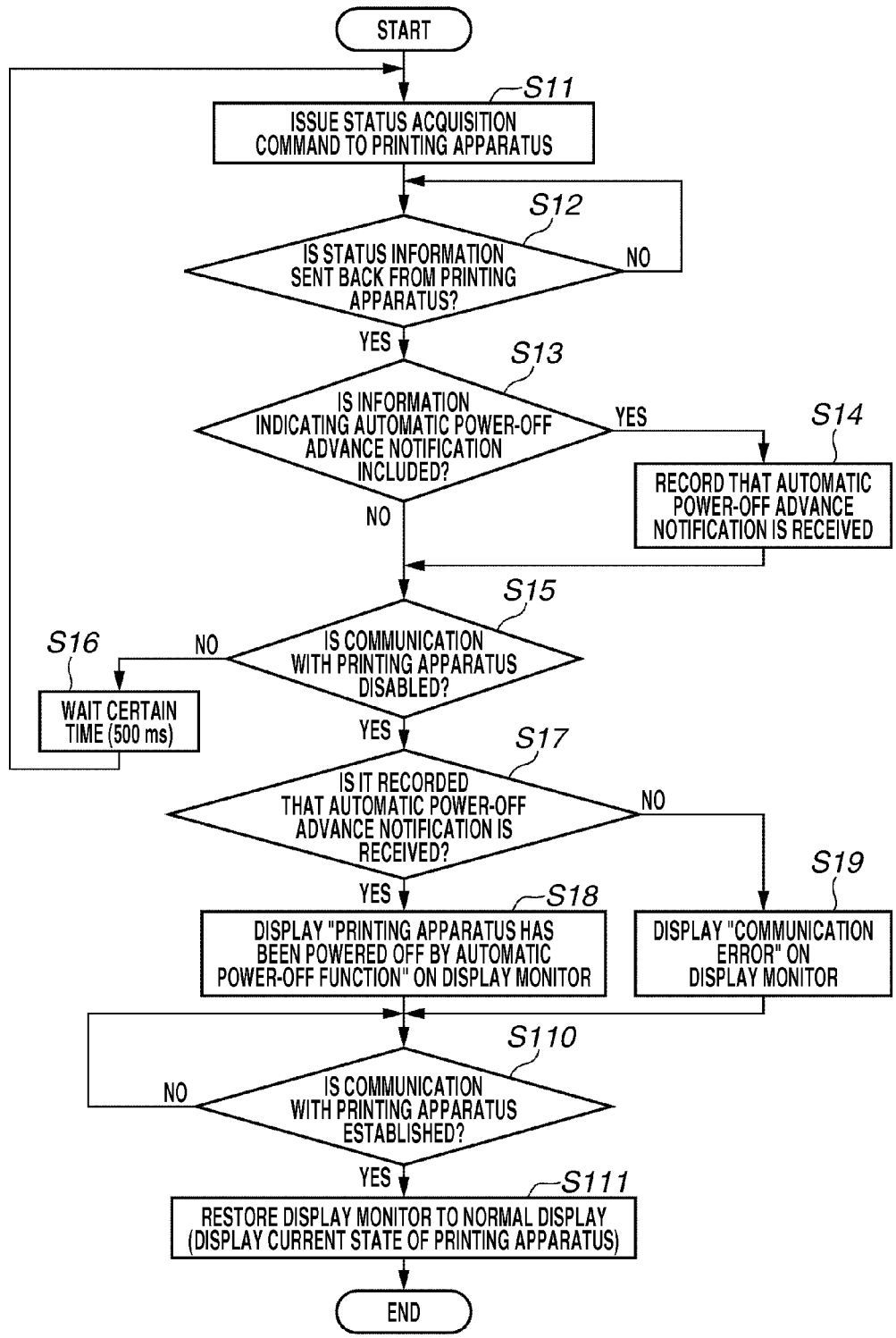
FIG. 5 is a flowchart illustrating a method for controlling the host computer illustrated in FIG. 1.

Next, a method for controlling the host computer 100 will be described with reference to the flowchart of FIG. 5. Such a control method is implemented by the CPU 101 of the host computer 100 executing a program based on the flowchart of FIG. 5.

In step S11, the CPU 101 initially issues the status acquisition command to the printing apparatus 200. In step S12, the CPU 101 determines whether the status information indicating the status of the printing apparatus 200 is sent back from the printing apparatus 200. The CPU 101 waits (NO in step S12) until the status information is sent back from the printing apparatus 200. If the CPU 101 receives the status information of the printing apparatus 200 (YES in step S12), then in step S13, the CPU 101 determines whether the received status information of the printing apparatus 200 includes information indicating an automatic power-off advance notification.

If the automatic power-off advance notification is included (YES in step S13), then in step S14, the CPU 101 records in the RAM 102 that the automatic power-off advance notification is received. The automatic power-off advance notification is information (power shift information) to be transmitted from the printing apparatus 200 to the host computer 100 when the printing apparatus 200 satisfies any one of conditions for the execution of the automatic power-off function to be described later. When the notification is received, the host computer 100 is informed that the printing apparatus 200 enters the power-off state by the automatic power-off function.

In step S15, the CPU 101 monitors the communication state with the printing apparatus 200. If the CPU 101 determines that the communication with the printing apparatus 200 is normal (NO in step S15), then in step S16, the CPU 101 waits a certain period of time (for example, 500 ms) and returns to step S11. In other words, the CPU 101 polls the status information of the printing apparatus 200 at regular intervals (repeats steps S11 to S15).

If the CPU 101 determines that the communication with the printing apparatus 200 is disabled (YES in step S15), then in step S17, the CPU 101 determines whether it is recorded in the RAM 102 that the automatic power-off advance notification is received. Here, the CPU 101 monitors signals transmitted and received to/from the printing apparatuses 200, and if an interruption of the signal transmission and reception is detected, determines that the communication with the printing apparatus 200 is disabled.

Figure 11:
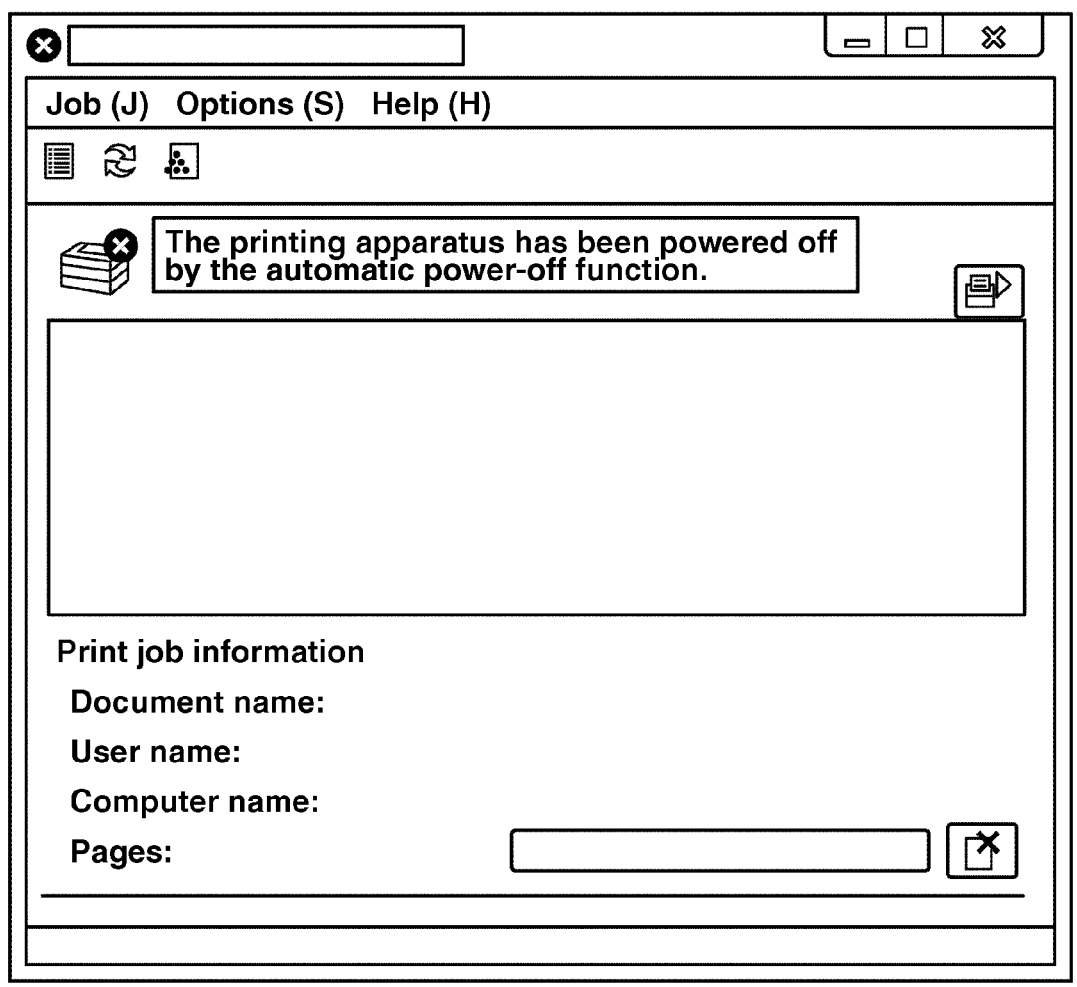
FIG. 11 is a diagram illustrating a screen of a display monitor of a host computer when a printing apparatus enters a power-off state by an automatic power-off function.

If it is recorded that the automatic power-off advance notification is received (YES in step S17), then in step S18, the CRTC 106 displays contents indicating that the printing apparatus 200 has been powered off by the automatic power-off function on the display monitor 110. Specifically, as illustrated in FIG. 11, the CRTC 106 displays a screen saying that the "printing apparatus has been powered off by the automatic power-off function" on the display monitor 110. Here, the CPU 101 deletes the record that the automatic power-off advance notification is received. In the present exemplary embodiment, the CPU 101 continues polling the status information of the printing apparatus 200 even after the foregoing screen is displayed.

Figure 12:
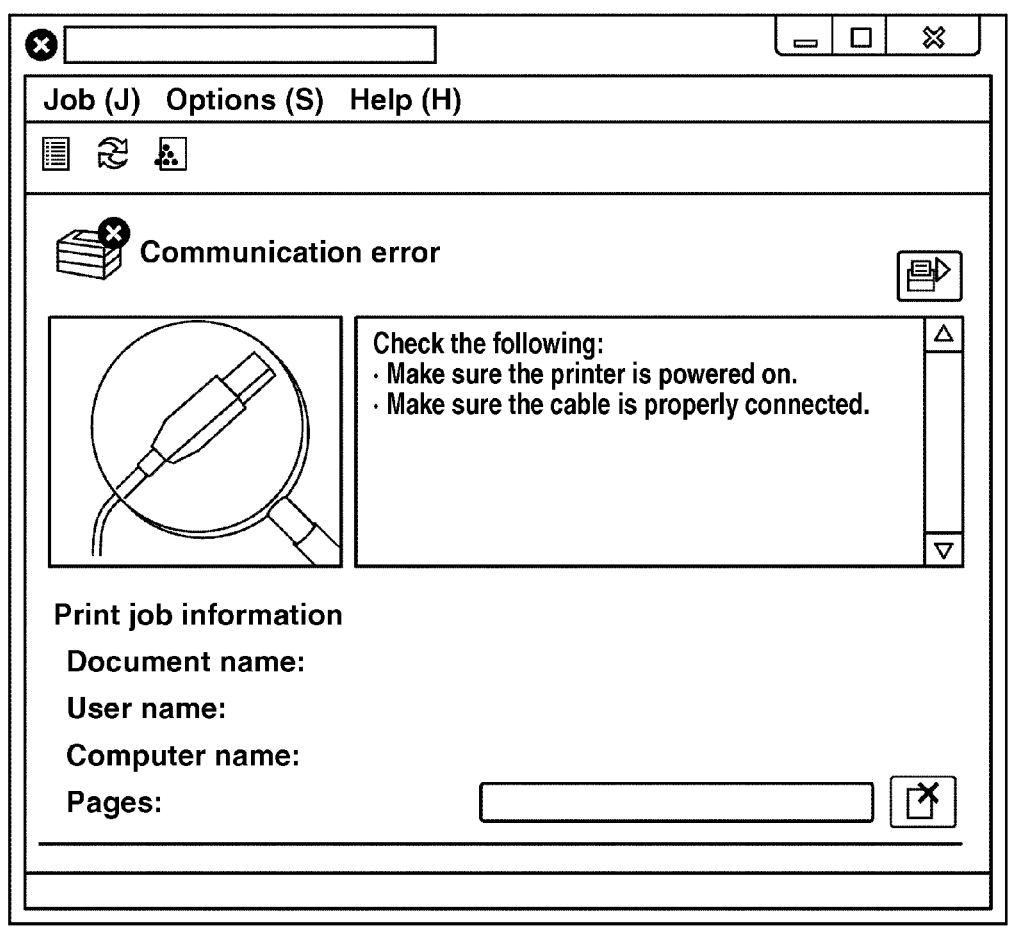
FIG. 12 is a diagram illustrating a screen of a display monitor of a host computer when communication with a printing apparatus cannot be established.

Now, if, in step S17, it is not recorded that the automatic power-off advance notification is received (NO in step S17), then in step S19, the CRTC 106 displays contents indicating that the communication with the printing apparatus 200 is disabled on the display monitor 110. Specifically, as illustrated in FIG. 12, the CRTC 106 displays a message "communication error" on the display monitor 110. The CRTC 106 continues displaying the contents while the host computer 100 is not able to communicate with the printing apparatus 200.

In step S110, the CPU 101 determines whether the communication with the printing apparatus 200 is established. Specifically, the CPU 101 monitors the signals to be transmitted and received to/from the printing apparatus 200, and if the resumption of the signal transmission and reception is detected, determines that the communication with the printing apparatus 200 is resumed. The CPU 101 waits (NO in step S110) until the communication with the printing apparatus 200 is established. If the CPU 101 determines that the communication with the printing apparatus 200 is established (YES in step S110), then in step S111, the CRTC 106 displays the current status of the printing apparatus 200 on the display monitor 110.

As described above, the CPU 101 continues polling the status information of the printing apparatus 200 even after step S18. The CPU 101 can thus acquire the status information of the printing apparatus 200 when the communication with the printing apparatus 200 is established. The CPU 101 then displays the current status of the printing apparatus 200 on the display monitor 110 based on the acquired status information of the printing apparatus 200.

(Description of Operation of Printing Apparatus)

Figure 6:
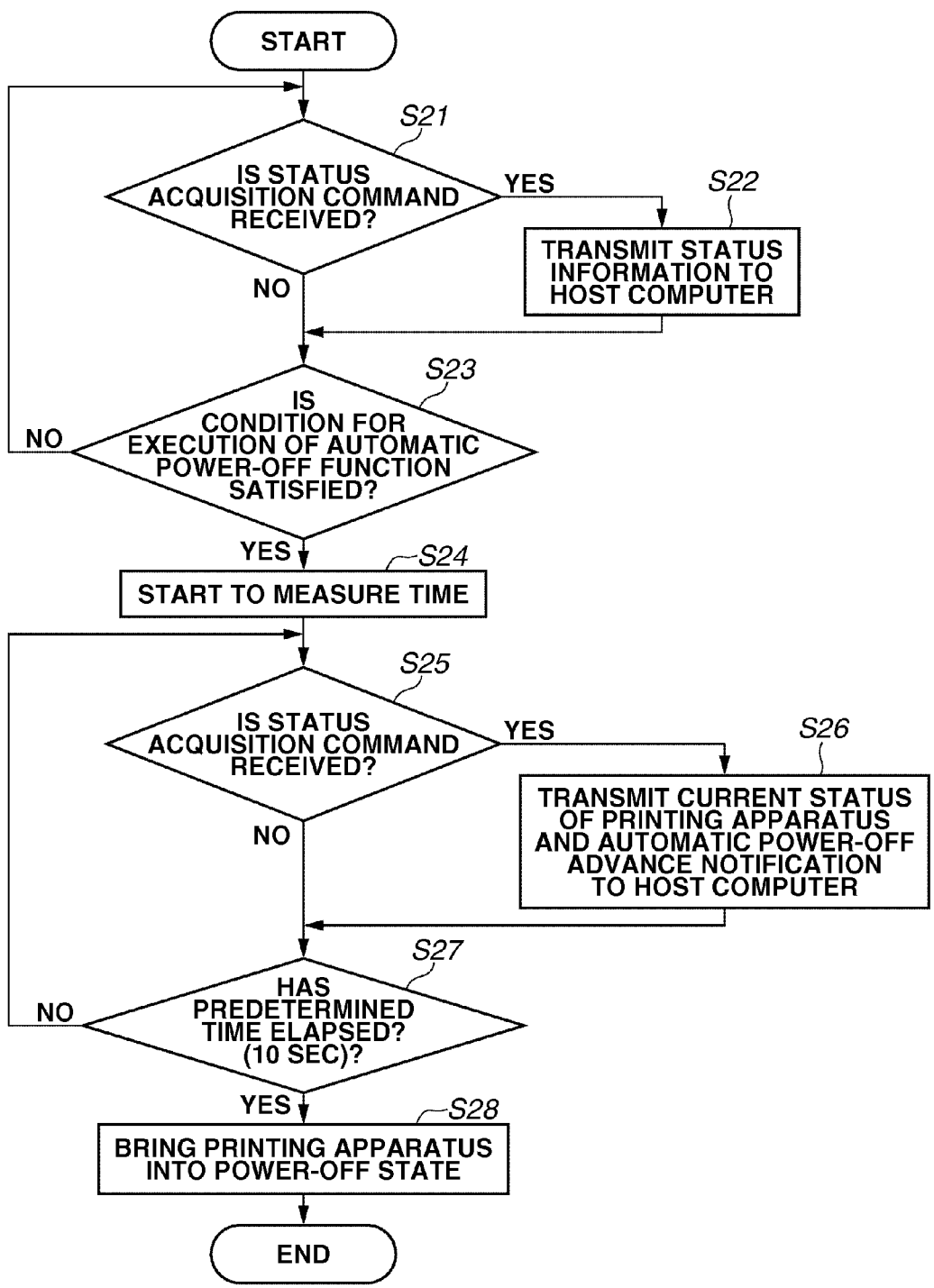
FIG. 6 is a flowchart illustrating a method for controlling the printing apparatus illustrated in FIG. 1.

Next, a method for controlling the printing apparatus 200 will be described with reference to the flowchart of FIG. 6. Such a control method is implemented by the CPU 201 of the printing apparatus 200 executing a program based on the flowchart of FIG. 6.

In step S21, the CPU 201 determines whether the status acquisition command transmitted from the host computer 100 is received. If the status acquisition command is determined to be received (YES in step S21), then in step S22, the CPU 201 generates status information indicating the current status of the printing apparatus 200 and transmits the status information to the host computer 100. In step S23, the CPU 201 determines whether a condition for the execution of the automatic power-off function is satisfied.

In the present exemplary embodiment, the conditions for the execution of the automatic power-off function are satisfied:
when a preset time (fixed time) has come, or
when printing has not been performed for a preset period of time.

Such conditions for the execution of the automatic power-off function are just a few examples. Exemplary embodiments of the present invention are not limited thereto.

If the CPU 201 determines that neither of the foregoing conditions for the execution of the automatic power-off function is satisfied (NO in step S23), the CPU 201 returns to step S21. On the other hand, if the CPU 201 determines that any one of the conditions for the execution of the automatic power-off function is satisfied (YES in step S23), then in step S24, the timer 209 starts to measure time.

In the present exemplary embodiment, if the time measured by the timer 209 has reached a predetermined time set in advance (YES in step S27), then in step S28, the CPU 201 transmits a signal to the power supply control unit 208, and the power supply control unit 208 brings the printing apparatus 200 into the power-off state. In other words, even if any one of the conditions for the execution of the automatic power-off function is satisfied, the printing apparatus 200 according to the present exemplary embodiment will not immediately enter the power-off state. An example of the predetermined time is 10 seconds. The predetermined time is needed for the host computer 100 connected to the printing apparatus 200 to surely acquire the automatic power-off advance notification by polling.

In step S25, after the timer 209 starts to measure the predetermined time in step S24, the CPU 201 determines whether the status acquisition command transmitted from the host computer 100 is received. If the CPU 201 determines that the status acquisition command is received (YES in step S25), then in step S26, the CPU 201 transmits the current status of the printing apparatus 200 and the automatic power-off advance notification to the host computer 100.

In step S27, the CPU 201 determines whether the time measured by the timer 209 has reached the predetermined time (for example, 10 seconds). If the CPU 201 determines that the time measured by the timer 209 has reached the predetermined time, e.g., 10 seconds (YES in step S27), then in step S28, the CPU 201 transmits a signal to the power supply control unit 208, and the power supply control unit 208 brings the printing apparatus 200 into the power-off state.

In the present exemplary embodiment, if the printing apparatus 200 has entered the power-off state by the automatic power-off function, no power is supplied to the printer controller 210 which is typified by the CPU 201 and the I/F unit 301. The printing apparatus 200 in the power-off state thus becomes unable to reply to an inquiry from the host computer 100. On the other hand, if the CPU 201 determines that the predetermined time has not yet elapsed (NO in step S27), then in step S25, the CPU 201 determines again whether the status acquisition command transmitted from the host computer 100 is received.

In the exemplary embodiment described above, the printing apparatus 200 can transmit the automatic power-off advance notification to the host computer 100 connected to the printing apparatus 200 before the printing apparatus 200 enters the power-off state by the automatic power-off function of the printing apparatus 200. Consequently, the message "the printing apparatus has been powered off by the automatic power-off function" can be displayed on the display monitor 110 of the host computer 100. The user can thus recognize that the printing apparatus 200 enters the power-off state by the automatic power-off function.

In the exemplary embodiment described above, when any one of the conditions for the execution of the automatic power-off function is satisfied, the printing apparatus 200 will not immediately enter the power-off state but instead can wait a predetermined time before entering the power-off state. In such a predetermined time, the host computer 100 can surely acquire the automatic power-off advance notification by polling.

Next, a printing system according to a second exemplary embodiment of the present invention will be described. Since the printing system according to the second exemplary embodiment has a hardware configuration similar to that of the printing system 1 according to the first exemplary embodiment, a description thereof will be omitted. The second exemplary embodiment deals with a method for controlling the printing system when the automatic power-off function is cancelled or delayed after the host computer 100 receives the automatic power-off advance notification.

(Description of Operation of Host Computer)

A method for controlling the host computer 100 will initially be described with reference to the flowchart of FIG. 7.

Figure 7:
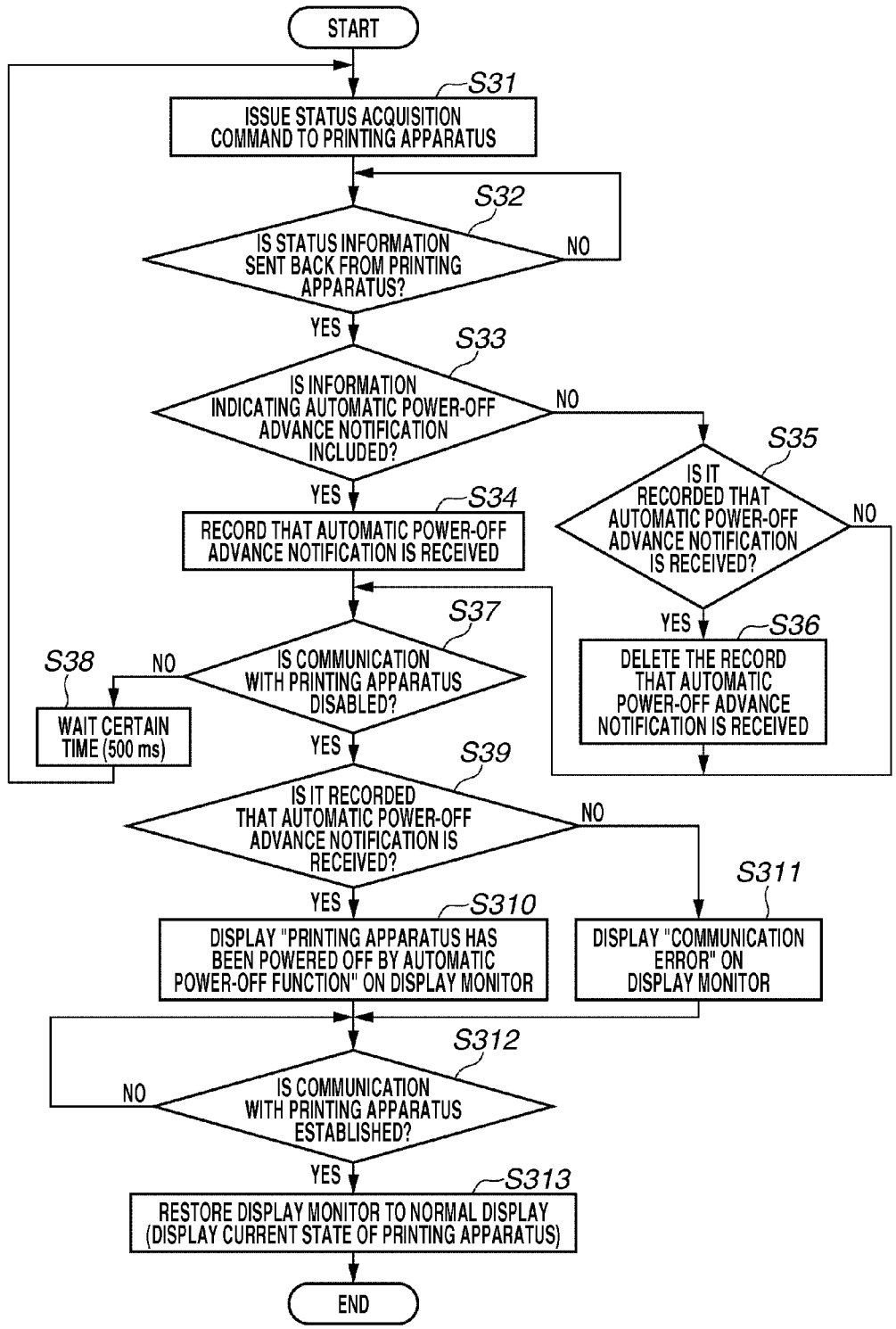
FIG. 7 is a flowchart illustrating a method for controlling a host computer according to a second exemplary embodiment of the present invention.

Such a control method is implemented by the CPU 101 of the host computer 100 executing a program based on the flowchart of FIG. 7.

The processing of steps S31 to S34 is similar to that of steps S11 to S14 of the first exemplary embodiment, respectively. A description thereof will be omitted. If, in step S33, the CPU 101 determines that the received status information of the printing apparatus 200 does not include the automatic power-off advance notification (NO in step S33), then in step S35, the CPU 101 determines whether there is a record that the automatic power-off notification is received. If the CPU 101 determines that there is the record that the automatic power-off advance notification is received (YES in step S35), then in step S36, the CPU 101 deletes the record. The CPU 101 then performs the processing of step S37 and subsequent steps.

On the other hand, if the CPU 101 determines that there is no record that the automatic power-off advance notification is received (NO in step S35), then the CPU 101 performs the processing of step S37 and subsequent steps. The processing of step S37 and subsequent steps is similar to that of step S15 and subsequent steps according to the first exemplary embodiment. A description thereof will be omitted.

Description of Operation of Printing Apparatus
(Description of Operation of Printing Apparatus)

Figure 8:
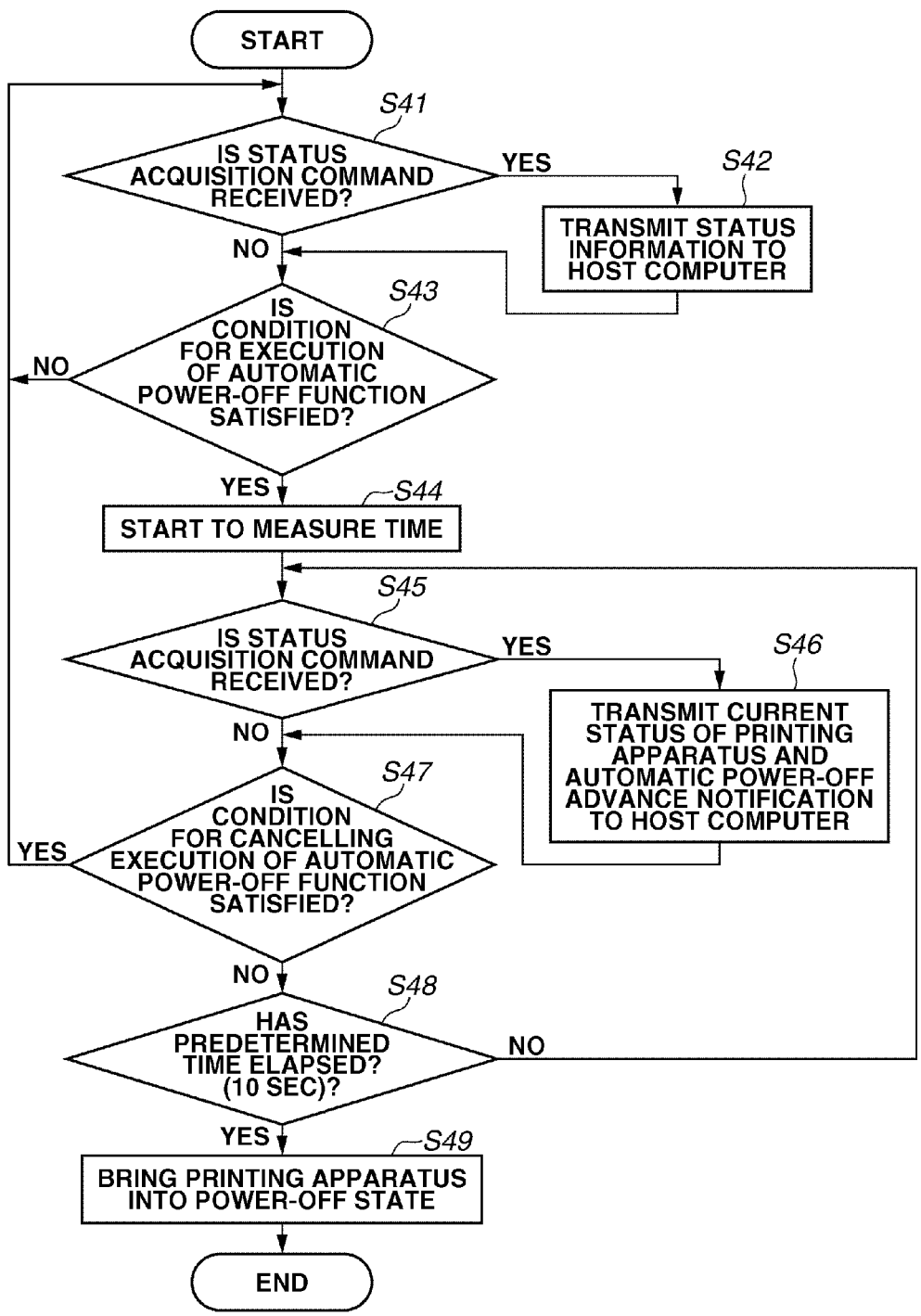
FIG. 8 is a flowchart illustrating a method for controlling a printing apparatus according to the second exemplary embodiment of the present invention.

Next, a method for controlling the printing apparatus 200 when the printing apparatus 200 is powered off by the automatic power-off function will be described with reference to the flowchart of FIG. 8. Such a control method is implemented by the CPU 201 of the printing apparatus 200 executing a program based on the flowchart of FIG. 8.

The processing of steps S41 to S46 is similar to that of steps S21 to S26 of the first exemplary embodiment, respectively. A description thereof will be omitted. If, in step S43, a condition for the execution of the automatic power-off function is satisfied (YES in step S43), then in step S44, the timer 209 measures the predetermined time. In step S47, the CPU 201 determines whether a condition for cancelling the execution of the automatic power-off function is satisfied. If the CPU 201 determines that the condition for cancelling the execution of the automatic power-off function is satisfied (YES in step S47), the CPU returns to step S41 and repeats the processing of steps S41 to S46. On the other hand, if the CPU 201 determines that the condition for cancelling the execution of the automatic power-off function is not satisfied (NO in step S47), the CPU 201 performs the processing of steps S48 and S49.

The processing of steps S48 and S49 is the same as that of steps S27 and 28 of the first exemplary embodiment, respectively. A description thereof will be omitted. The foregoing condition for cancelling the execution of the automatic power-off function is satisfied when the power switch 211 is turned on.

Such a condition for cancelling the execution of the automatic power-off function is just an example. Exemplary embodiments of the present invention are not limited thereto.

The host computer 100 according to the second exemplary embodiment deletes the record that the automatic power-off advance notification is received if a condition for the execution of the automatic power-off function is satisfied and then the condition for cancelling the execution of the automatic power-off function is satisfied. As a result, the host computer 100 can display the correct status of the printing apparatus 200 on the display monitor 110.

Next, a printing system according to a third exemplary embodiment of the present invention will be described. Since the printing system according to the third exemplary embodiment has a hardware configuration similar to that of the printing system 1 according to the first exemplary embodiment, a description thereof will be omitted. The third exemplary embodiment deals with a method for controlling the printing system not only when the printing apparatus 200 enters the power-off state by the automatic power-off function but also when the printing apparatus 200 is powered off by a user's operation on the power switch 211.

(Description of Operation of Host Computer)

Figure 9:
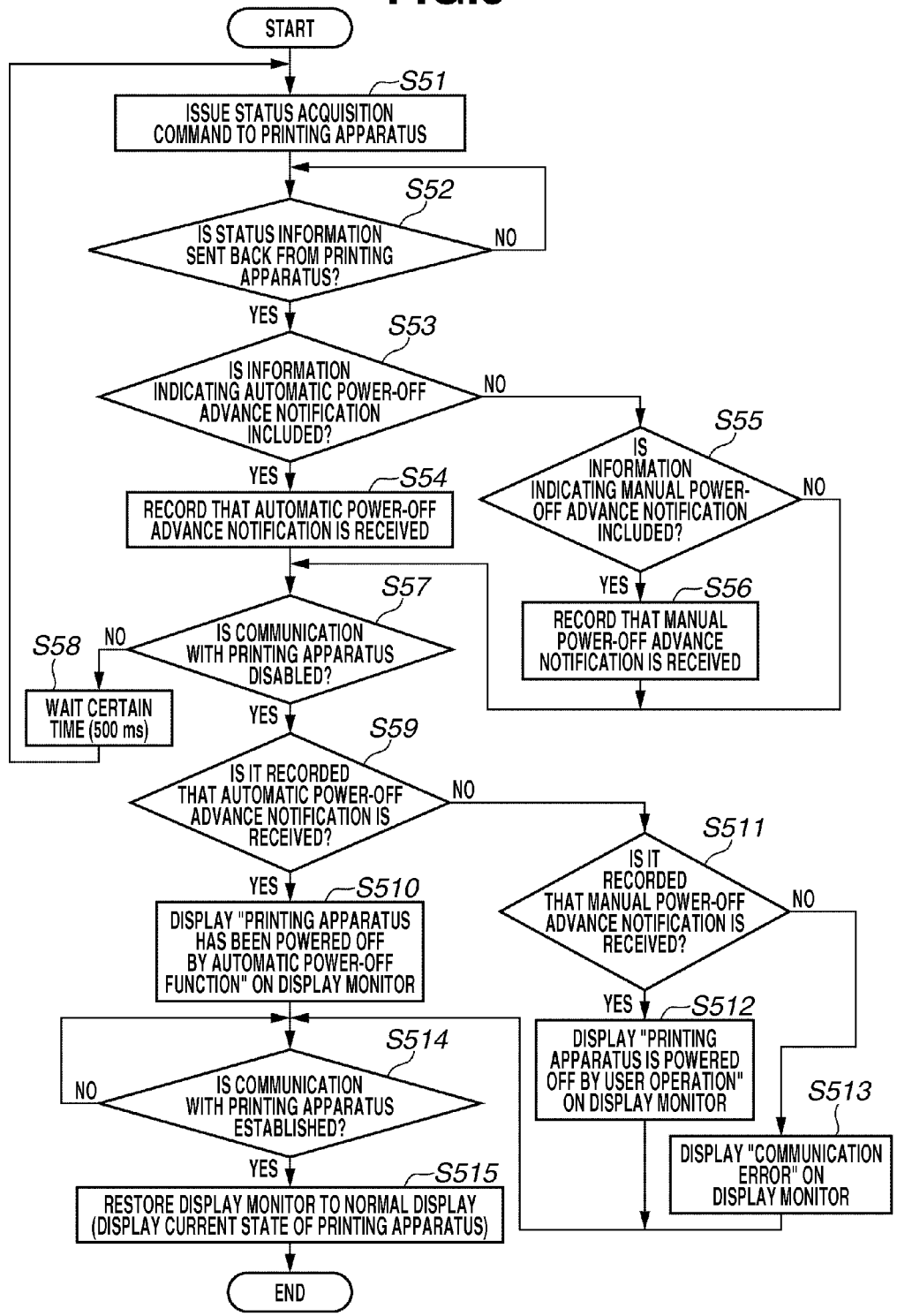
FIG. 9 is a flowchart illustrating a method for controlling a host computer according to a third exemplary embodiment of the present invention.

A method for controlling the host computer 100 will initially be described with reference to the flowchart of FIG. 9. Such a control method is implemented by the CPU 101 of the host computer 100 executing a program based on the flowchart of FIG. 9.

The processing of steps S51 to S54 is similar to that of steps S11 to S14 of the first exemplary embodiment, respectively. A description thereof will be omitted.

If the status information of the printing apparatus 200 received by the host computer 100 does not include the automatic power-off advance notification (NO in step S53), then in step S55, the CPU 101 determines whether the status information includes information indicating a manual power-off advance notification. If the status information received by the CPU 101 is determined to include the information indicating the manual power-off advance notification (YES in step S55), then in step S56, the CPU 101 records in the RAM 102 that the manual power-off advance notification is received. In step S57, the CPU 101 then monitors the communication state of the printing apparatus 200.

On the other hand, if the status information received by the CPU 101 does not include the information indicating the manual power-off advance notification (NO in step S55), then in step S57, the CPU 101 monitors the communication state of the printing apparatus 200. The manual power-off advance notification is information to be transmitted from the printing apparatus 200 to the host computer 100 when the power switch 211 of the printing apparatus is turned off by a user's operation. By receiving the notification, the host computer 100 is informed that the printing apparatus 200 is manually brought into the power-off state.

If, in step S57, the CPU 101 determines that the communication with the printing apparatus 200 is normal (NO in step S57), then in step S58, the CPU 101 waits a certain period of time (for example, 500 ms) and returns to step S51. In other words, the CPU 101 polls the status information of the printing apparatus 200 at regular intervals (repeats steps S51 to S56).

On the other hand, if the CPU 101 determines that the communication with the printing apparatus 200 is disabled (YES in step S57), then in step S59, the CPU 101 determines whether it is recorded in the RAM 102 that the automatic power-off advance notification is received. If the CPU 101 determines that there is a record that the automatic power-off advance notification is received (YES in step S59), then in step S510, the CRTC 106 displays contents indicating that the printing apparatus 200 enters the power-off state by the automatic power-off function (see FIG. 11) on the display monitor 110. Here, the CPU 101 deletes the record of the reception of the automatic power-off advance notification.

Figure 13:
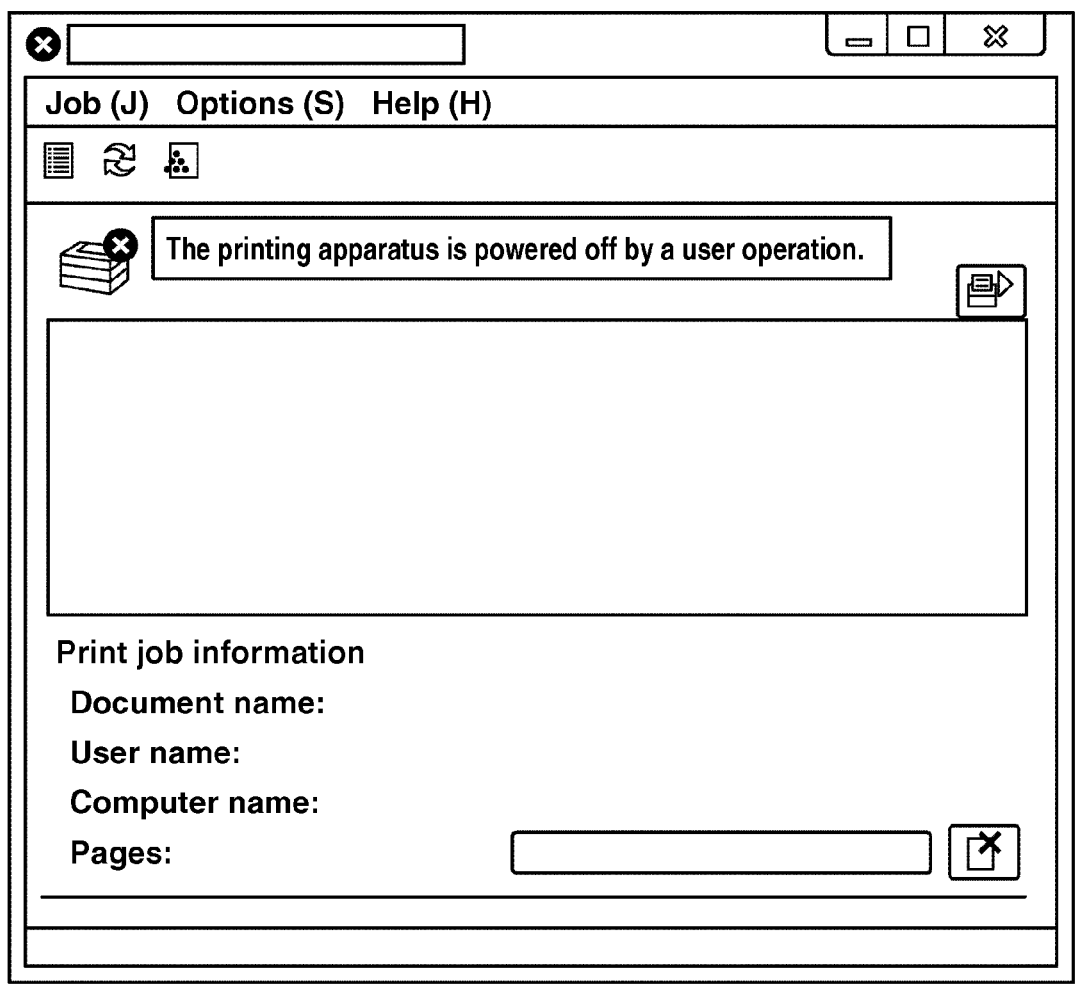
FIG. 13 is a diagram illustrating a screen of a display monitor of a host computer when a printing apparatus enters a power-off state due to turning off of a power switch.

If, in step S59, it is not recorded that the CPU 101 has received the automatic power-off advance notification (NO in step S59), then in step S511, the CPU 101 determines whether it is recorded that the manual power-off advance notification is received. If there is a record that the manual power-off advance notification is received (YES in step S511), then in step S512, the CRTC 106 displays contents indicating that the printing apparatus 200 is powered off by a user's operation on the power switch 211. Specifically, as illustrated in FIG. 13, a message "the printing device is powered off by a user operation" is displayed on the display monitor 110. Here, the CPU 101 deletes the record of the reception of the manual power-off advance notification.

If, in step S511, the CPU 101 determines that it is not recorded that the CPU 101 has received the manual power-off advance notification (NO in step S511), then in step S513, the CRTC 106 displays contents indicating that the communication with the printing apparatus 200 is disabled (see FIG. 12).

The CRTC 106 continues displaying the foregoing contents as long as the host computer 100 cannot communicate with the printing apparatus 200. In step S514, the CPU 101 determines whether the communication with the printing apparatus 200 is established. The CPU 101 waits (NO in step S514) until the communication with the printing apparatus 200 is established. If the communication with the printing apparatus 200 is determined to be established (YES in step S514), then in step S515, the CRTC 106 displays the current status of the printing apparatus 200 on the display monitor 110.

(Description of Operation of Printing Apparatus)

Figure 10:
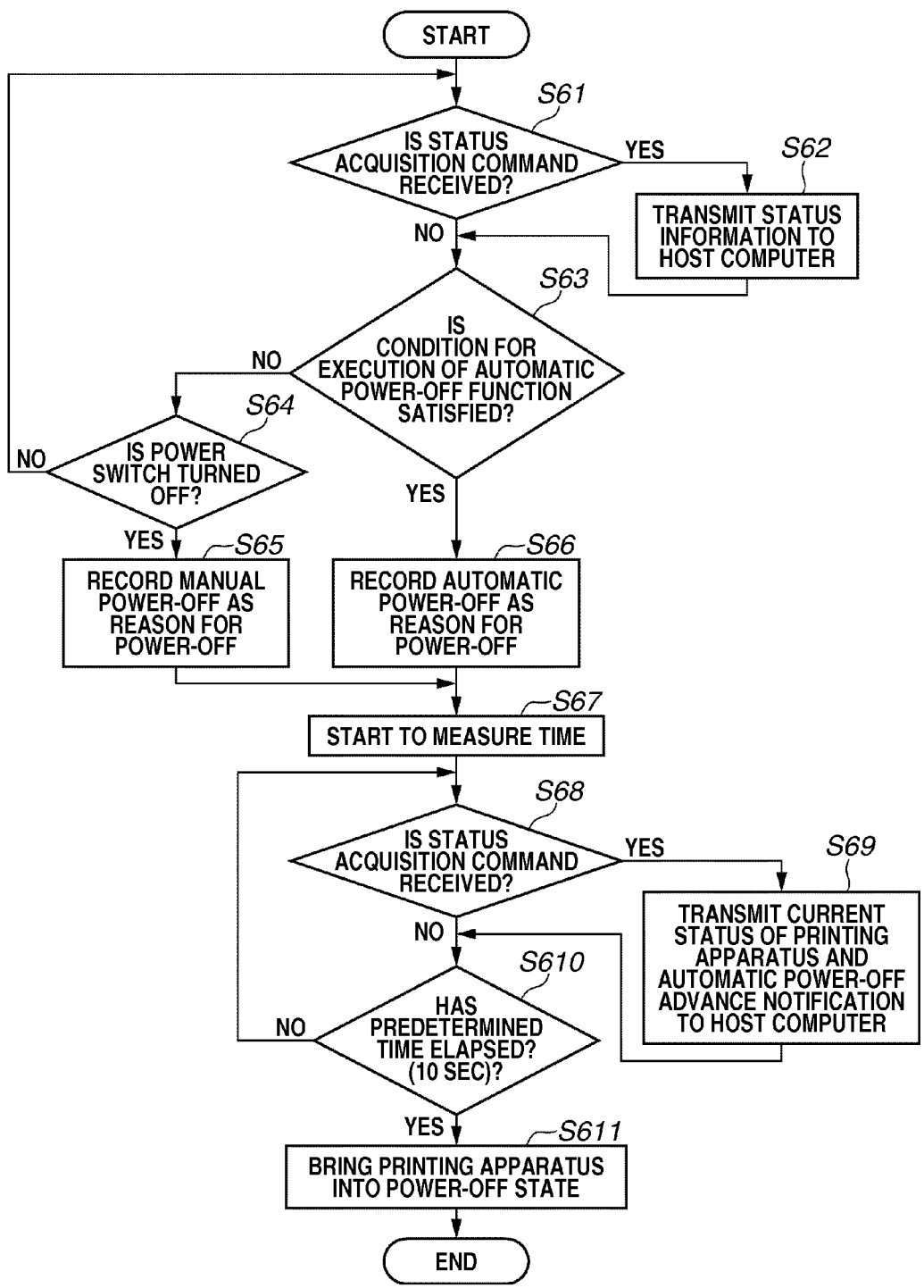
FIG. 10 is a flowchart illustrating a method for controlling a printing apparatus according to the third exemplary embodiment of the present invention.

Next, a method for controlling the printing apparatus 200 will be described with reference to the flowchart of FIG. 10. Such a control method is implemented by the CPU 201 of the printing apparatus 200 executing a program based on the flowchart of FIG. 10.

The processing of steps S61 to S63 is similar to that of steps S21 to S23 of the first exemplary embodiment, respectively. A description thereof will be omitted.

If, in step S63, the CPU 201 determines that a condition for the execution of the automatic power-off function is satisfied (YES in step S63), then in step S66, the CPU 201 records in the RAM 102 that the printing apparatus 200 has entered the power-off state by the automatic power-off function as a reason for power-off. On the other hand, if the CPU 201 determines that no condition for the execution of the automatic power-off function is satisfied (NO in step S63), then in step S64, the CPU 201 determines whether the power switch 211 is turned off.

If the CPU 201 determines that the power switch 211 is turned off (YES in step S64), then in step S65, the CPU 201 records the turning off of the power switch 211 as a reason for power-off state. On the other hand, if the CPU 201 determines that the power switch 211 is not turned off (NO in step S64), the CPU 201 returns to step S61.

If a condition for the execution of the automatic power-off function is satisfied (YES in step S63) or if the power switch 211 is turned off (YES in step S64), then in step S67, the timer 209 measures time.

In step S68, after the timer 209 has started to measure a predetermined time in step S67, the CPU 201 determines whether the status acquisition command transmitted from the host computer 100 is received. If the CPU 201 determines that the status acquisition command is received (YES in step S68), then in step S69, the CPU 201 transmits the current status of the printing apparatus 200 and the reason that the printing apparatus 200 enters the power-off state, recorded in step S65 or S66, to the host computer 100.

In step S610, the CPU 201 determines whether the time measured by the timer 209 has reached the predetermined time (for example, 10 seconds). If the CPU 201 determines that the time measured by the timer 209 has reached the predetermined time (YES in step S610), then in step S611, the CPU 201 brings the printing apparatus 200 into the power-off state. On the other hand, if the CPU 201 determines that the predetermined time has not elapsed (NO in step S610), then in step S68, the CPU 201 determines again whether the status acquisition command transmitted from the host computer 100 is received.

In the third exemplary embodiment, different contents are displayed on the display monitor 110 when the printing apparatus 200 enters the power-off state by the automatic power-off function, and when a user manually operates the power switch 211 to bring the printing apparatus 200 into the power-off state. A user can thus be informed of the reason that the printing apparatus 200 has entered the power-off state for.

Other Embodiments

The foregoing exemplary embodiments have dealt with a rotating development rotary type laser beam printer as an example of the printing apparatus. However, a printing apparatus according to an exemplary embodiment of the present invention may be a printer of other printing methods such as an inkjet printer and a thermal (thermal transfer) printer.

An exemplary embodiment of the present invention may be practiced by performing the following processing. The processing includes supplying software (program) for implementing the functions of the foregoing exemplary embodiments to a system or an apparatus through a network or various types of storage media, and reading and executing the program by a computer (or CPU or microprocessing unit (MPU)) of the system or apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-277323 filed Dec. 19, 2011, which is hereby incorporated by reference herein in its entirety.

What is claimed is:

1. An information processing apparatus capable of communication with an external apparatus through a network, the information processing apparatus comprising:
   a reception unit configured to receive from the external apparatus information indicating that the external apparatus is to automatically enter a power-off state, wherein the external apparatus transmits the information in a case where a preset time has come or printing has not been performed for a preset period of time in the external apparatus;
   a storage unit configured to store the information received by the reception unit;
   a determination unit configured to determine whether the communication with the external apparatus is disabled; and
   a display unit configured, if the information is stored in the storage unit when the determination unit determines that the communication with the external apparatus is disabled, to display information indicating that the external apparatus has automatically entered the power-off state, and if the information is not stored in the storage unit when the determination unit determines that the communication with the external apparatus is disabled, to display information indicating that the communication with the external apparatus is disabled,
   wherein the display unit removes the information indicating that the external apparatus has entered the power-off state if the determination unit determines that the communication with the external apparatus is able after the determination unit determines that the communication with the external apparatus is disabled.

2. The information processing apparatus according to claim 1, wherein the information that the reception unit receives is transmitted by the external apparatus before the external apparatus enters the power-off state in a case where the preset time has come or printing has not been performed for the preset period of time in the external apparatus.

3. The information processing apparatus according to claim 1, wherein the reception unit receives information indicating that the external apparatus is to manually enter the power-off state, and
   wherein the display unit is configured, if the information is stored in the storage unit when the determination unit determines that the communication with the external apparatus is disabled, to display information indicating that the external apparatus has manually entered the power-off state.

4. The information processing apparatus according to claim 1, further comprising:
   a judgment unit configured, after the display unit displays the information, to determine whether the communication with the external apparatus is established,
   wherein the reception unit is configured to receive a state of the external apparatus, and
   wherein the display unit is configured, if the judgment unit determines that the communication with the external apparatus is established, to display the state of the external apparatus received by the reception unit.

5. A method for controlling an information processing apparatus capable of communication with an external apparatus through a network, the method comprising:
   receiving information from the external apparatus, the information indicating that the external apparatus is to enter a power-off state, wherein the external apparatus transmits the information in a case where a preset time has come or printing has not been performed for a preset period of time in the external apparatus;
   storing the received information;
   determining whether the communication with the external apparatus is disabled; and
   when it is determined that the communication with the external apparatus is disabled, if the information is stored, displaying information indicating that the external apparatus has automatically entered the power-off state, and if the information is not stored when the determining determines that the communication with the external apparatus is disabled, displaying information indicating that the communication with the external apparatus is disabled,
   wherein the information indicating that the external apparatus has entered the power-off state is removed from a display section if it is determined in the determining step that the communication with the external apparatus is able after it is determined in the determining step that the communication with the external apparatus is disabled.

6. A recording medium containing a program for causing a computer to perform the method for controlling an information processing apparatus according to claim 5.

7. The information processing apparatus according to claim 1, further comprising:
   a sending unit configured to send a command,
   wherein the external apparatus transmits the information in response to receiving the command.

* * * * *